United States Patent
Sugahara

(10) Patent No.: US 9,959,403 B2
(45) Date of Patent: May 1, 2018

(54) INFORMATION PROCESSING SYSTEM FOR MUTUAL AUTHENTICATION BETWEEN COMMUNICATION DEVICE AND STORAGE

(71) Applicant: MegaChips Corporation, Osaka-shi (JP)

(72) Inventor: Takahiko Sugahara, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 148 days.

(21) Appl. No.: 14/321,041

(22) Filed: Jul. 1, 2014

(65) Prior Publication Data
US 2015/0012968 A1    Jan. 8, 2015

(30) Foreign Application Priority Data

Jul. 3, 2013  (JP) ................................. 2013-139899
Jul. 3, 2013  (JP) ................................. 2013-139900

(51) Int. Cl.
*G06F 21/44*    (2013.01)
*G06F 21/10*    (2013.01)
(Continued)

(52) U.S. Cl.
CPC ............ *G06F 21/445* (2013.01); *G06F 12/14* (2013.01); *G06F 12/1408* (2013.01);
(Continued)

(58) Field of Classification Search
CPC ........ G06F 21/44; G06F 21/445; G06F 12/14; G06F 21/10; G06F 12/1408;
(Continued)

(56) References Cited

U.S. PATENT DOCUMENTS 8,588,424 B2    11/2013   Yamada et al.
2009/0037988 A1  2/2009   Yang et al.
(Continued)

FOREIGN PATENT DOCUMENTS

JP    1-126793 A     5/1989
JP    11-252068      9/1999
(Continued)

OTHER PUBLICATIONS

Office Action issued in Japanese Application No. 2013-139900 dated May 24, 2017 with English translation.
(Continued)

*Primary Examiner* — Theodore C Parsons
(74) *Attorney, Agent, or Firm* — Oblon, McClelland, Maier & Neustadt, L.L.P.

(57) ABSTRACT

The communication device sends an authentication code (N) to a semiconductor memory to instruct the semiconductor memory to authenticate the communication device. The semiconductor memory authenticates the communication device based on the authentication code (N), and if the communication device is determined to be valid, sends an authentication code (N+1) to the communication device to instruct the communication device to authenticate the semiconductor memory in response to the authentication code (N). The communication device authenticates the semiconductor memory based on the authentication code (N+1).

7 Claims, 2 Drawing Sheets

(51) Int. Cl.
  *G06F 12/14* (2006.01)
  *H04L 9/32* (2006.01)
(52) U.S. Cl.
  CPC .............. *G06F 21/10* (2013.01); *G06F 21/44* (2013.01); *H04L 9/3271* (2013.01); *H04L 9/3273* (2013.01); *H04L 2209/60* (2013.01)
(58) Field of Classification Search
  CPC ..... H04L 2209/60; H04L 9/32; H04L 9/3271; H04L 9/3273
  See application file for complete search history.

(56) References Cited

U.S. PATENT DOCUMENTS

| | | | | |
|---|---|---|---|---|
| 2009/0132820 A1* | 5/2009 | Hirai | ................. | G06F 21/31 713/169 |
| 2014/0123320 A1* | 5/2014 | Isozaki | ................. | G06F 21/44 726/29 |
| 2014/0281563 A1* | 9/2014 | Nagai | ................. | G06F 21/445 713/185 |

FOREIGN PATENT DOCUMENTS

| | | |
|---|---|---|
| JP | 2000-349751 | 12/2000 |
| JP | 2007-86957 A | 4/2007 |
| JP | 2007-200481 A | 8/2007 |
| JP | 2009-105737 A | 5/2009 |
| JP | 4713745 | 6/2011 |
| WO | WO 20101044292 A1 | 4/2010 |

OTHER PUBLICATIONS

Research report on the current state of personal authentication techniques, Japan, Information-technology Promotion Agency, Security Center [online, Mar. 2003,pp. 13-18, [searched on Aug. 17, H24 (2012)], the Internet, URL,http://www.ipa.go.ip/security/fy14/reports/authentication/authentication_2002.pdf (cited in Office Action which serves as a Statement of Relevancy).

Office Action dated Dec. 15, 2017 in Japanese Patent Application No. 2013-139900, citing document AA therein, 6 Pages.

* cited by examiner

INFORMATION PROCESSING SYSTEM FOR MUTUAL AUTHENTICATION BETWEEN COMMUNICATION DEVICE AND STORAGE

CROSS-REFERENCE TO RELATED APPLICATIONS

This application claims priority to Japanese Patent Applications No. 2013-139899 and 2013-139900. The entire disclosure of Japanese Patent Applications No. 2013-139899 and 2013-139900 is hereby incorporated herein by reference.

BACKGROUND OF THE INVENTION

Field of the Invention

The present invention relates to an information processing system including a communication device and a storage device.

Description of the Background Art

An information processing system including a communication device and a semiconductor memory connected to each other employs a technique to mutually authenticate validity between the communication device and the semiconductor memory (mutual authentication technique) before allowing an access to content data, in order to prevent fraudulent reading of content data stored in the semiconductor memory.

In general challenge-response mutual authentication, the communication device generates a first authentication code, and encrypts and sends the first authentication code to the semiconductor memory. The semiconductor memory decrypts the received first authentication code, and encrypts the first authentication code again and sends back to the communication device. The communication device decrypts the received first authentication code, and checks for agreement between the first authentication code sent to the semiconductor memory and the first authentication code received from the semiconductor memory, in order to authenticate validity of the semiconductor memory. After authentication of the validity of the semiconductor memory by the communication device, the semiconductor memory generates a second authentication code, and encrypts and sends the second authentication code to the communication device. The communication device decrypts the received second authentication code, and encrypts the second authentication code again and sends back to the semiconductor memory. The semiconductor memory decrypts the received second authentication code, and checks for agreement between the second authentication code sent to the communication device and the second authentication code received from the communication device, in order to authenticate validity of the communication device.

JP2000-349751A describes an information processing device in which multiple mutual authentication procedures are prepared in advance, and a CPU selects one of the mutual authentication procedures and perform the selected mutual authentication procedure.

According to the above-described general challenge-response mutual authentication, sending of the first authentication code from the communication device to the semiconductor memory and receiving of the response value, and sending of the second authentication code from the semiconductor memory to the communication device and receiving of the response value are performed sequentially. Thus time required for mutual authentication is prolonged, and the processes are complicated.

Mutual authentication between the communication device and the semiconductor memory is generally performed by software processing in which a microprocessor performs an authentication program. Thus an attacker who intends to read content data in a fraudulent way would analyze authentication programs or tamper with data of a ROM or RAM in the microprocessor, so as to manipulate control of the microprocessor to avoid mutual authentication. Such manipulation will allow fraudulent reading of content data from the semiconductor memory.

SUMMARY OF THE INVENTION

It is an object of the present invention to obtain an information processing system that achieves high-speed and efficient mutual authentication between a communication device and a storage device.

Another object of the present invention is to obtain an information processing system that successfully prevents fraudulent reading of content data from a storage device, despite an attack to manipulate control of a microprocessor.

An information processing system according to a first aspect of the present invention includes a communication device and a storage device connected to the communication device. The communication device sends a first authentication code to the storage device to instruct the storage device to authenticate the communication device. The storage device authenticates the communication device based on the first authentication code, and if the communication device is determined to be valid, sends a second authentication code to the communication device to instruct the communication device to authenticate the storage device in response to the first authentication code. The communication device authenticates the storage device based on the second authentication code.

Thus mutual authentication between the communication device and the storage device is successfully performed by one-round communication of sending the first authentication code from the communication device to the storage device and in response sending the second authentication code from the storage device to the communication device. In consequence, high-speed and efficient processing is achieved, compared to general challenge-response mutual authentication that requires one-round communication each from the communication device and from the storage device (two-round communication in total).

Preferably the communication device includes a first number sequence generator that generates a first number sequence, and a first authentication controller that generates the first authentication code including the first number sequence. The storage device includes a second number sequence generator that generates a second number sequence identical to the first number sequence, and a second authentication controller that generates the second authentication code including the second number sequence. The second authentication controller authenticates the communication device depending on whether the first number sequence included in the first authentication code agrees with the second number sequence generated by the second number sequence generator. The first authentication controller authenticates the storage device depending on whether the second number sequence included in the second authentication code agrees with the first number sequence generated by the first number sequence generator.

The second authentication controller authenticates the communication device depending on whether the first number sequence included in the first authentication code agrees with the second number sequence generated by the second number sequence generator. If the communication device is invalid, the first authentication code does not include the first number sequence that agrees with the second number sequence generated by the second number sequence generator. Thus an invalid communication device is detected with reliability. The first authentication controller authenticates the storage device depending on whether the second number sequence included in the second authentication code agrees with the first number sequence generated by the first number sequence generator. If the storage device is invalid, the second authentication code does not include the first number sequence that agrees with the second number sequence generated by the first number sequence generator. Thus an invalid storage device is detected with reliability.

Preferably the first number sequence generator and the second number sequence generator respectively generate different first number sequence and second number sequence for each authentication process. In consequence, security is improved, since the first authentication code and the second authentication code are changed for each authentication process.

Preferably the first number sequence included in the first authentication code sent from the communication device to the storage device is different from the second number sequence included in the second authentication code sent from the storage device to the communication device in response to the first authentication code. In other words, the first authentication code that the communication device sends to the storage device is different from the second authentication code that the communication device receives from the storage device. In this way, using different authentication codes for sending and receiving improves security.

Preferably, the second authentication controller generates a second authentication code that includes an updated second number sequence generated subsequent to the second number sequence generated in authenticating the communication device. Thereby the second authentication code sent from the storage device to the communication device is changed from the first authentication code sent from the communication device to the storage device simply and reliably. The first authentication controller authenticates the storage device depending on whether an updated second number sequence included in the second authentication code agrees with an updated first number sequence generated subsequent to the first number sequence generated in generating the first authentication code. If the storage device is valid, the updated second number sequence included in the second authentication code agrees with the updated first number sequence generated by the first number sequence generator, while if the storage device is invalid, the updated second number sequence included in the second authentication code does not agree with the updated first number sequence generated by the first number sequence generator. Thus by verifying whether the updated second number sequence agrees with the updated first number sequence, validity of the storage device is determined simply and reliably.

An information processing system according to a second aspect of the present invention includes a communication device and a storage device connected to the communication device. The communication device includes a main controller that controls the information processing system by software processing, and a first control circuit provided in addition to the main controller, to control the storage device by hardware processing. The storage device includes a storage for storing content data, and a second control circuit control the storage. The main controller issues a command to instruct mutual authentication between the communication device and the storage device. Upon receipt of the command, the first control circuit performs mutual authentication with the second control circuit.

In a second aspect of the information processing system, the main controller issues a command to instruct to perform mutual authentication between the communication device and the storage device. Upon receipt of the command, the first control circuit performs mutual authentication with the second control circuit. In this mutual authentication between the communication device and the storage device, processing performed by the main controller includes only issuance of the command, and essential processing such as generation and verification of authentication codes is performed between the first and second control circuits. Thus despite an attack by manipulating control of the main controller such as analysis of programs, an attacker fails to avoid mutual authentication unless hardware processing by the first and second control circuits are analyzed and manipulated. In consequence, fraudulent reading of content data from a storage device is successfully prevented, despite an attack to manipulate control of a main controller.

Preferably, the first control circuit generates a first authentication code to instruct the second control circuit to authenticate the first control circuit based on the command, and sends the first authentication code to the second control circuit.

In this way, since the first authentication code is generated not by the main controller but by the first control circuit, an attacker cannot identify the first authentication code by an attack such as program analysis. In consequence, fraudulent reading of content data from a storage device is successfully prevented.

Preferably, the first control circuit generates the first authentication code by replacing data other than the command ID in the command with a number sequence generated by the first control circuit itself. This achieves simple generation of a first authentication code that cannot be identified by an attack such as program analysis. Since the first authentication code includes the command ID, the second control circuit appropriately starts mutual authentication upon receipt of the first authentication code.

Preferably, the second control circuit authenticates the first control circuit based on the first authentication code, and if the first control circuit is determined to be invalid, rejects to receive data sent from the communication device to the storage device thereafter.

Thus despite a read command from an invalid communication device to the storage device, the storage device rejects to receive the read command. In consequence, fraudulent reading of content data from a storage device is successfully prevented.

Preferably the second control circuit authenticates the first control circuit based on the first authentication code, and if the first control circuit is determined to be valid, generates a second authentication code to instruct the first control circuit to authenticate the second control circuit and sends the second authentication code to the first control circuit.

Thus mutual authentication between the communication device and the storage device is successfully performed by one-round communication of sending the first authentication code from the first control circuit to the second control circuit and in response sending the second authentication code from the second control circuit to the first control circuit. In consequence, high-speed and efficient processing is achieved, compared to general challenge-response mutual authentication that requires one-round communication each from the communication device and from the storage device (two-round communication in total).

Preferably, the first control circuit authenticates the second control circuit based on the second authentication code, and if the second control circuit is determined to be invalid, blocks communication thereafter between the communication device and the storage device.

This prevents a read command from being sent from the communication device to an invalid storage device and content data from being sent from the invalid storage device to the communication device. In consequence, fraudulent reading of content data from a storage device is successfully prevented.

Preferably the first control circuit includes a first number sequence generator that generates a first number sequence and a first authentication controller that generates the first authentication code including the first number sequence. The second control circuit includes a second number sequence generator that generates a second number sequence identical to the first number sequence and the second authentication controller that generates the second authentication code including the second number sequence. The second authentication controller authenticates the first control circuit depending on whether the first number sequence included in the first authentication code agrees with the second number sequence generated by the second number sequence generator, and the first authentication controller authenticates the second control circuit, depending on whether the second number sequence included in the second authentication code agrees with the first number sequence generated by the first number sequence generator.

If the communication device is invalid, the first authentication code does not include the first number sequence that agrees with the second number sequence generated by the second number sequence generator. Thus an invalid communication device (or first control circuit) is detected with reliability. The first authentication controller authenticates the second control circuit depending on whether the second number sequence included in the second authentication code agrees with the first number sequence generated by the first number sequence generator. If the storage device is invalid, the second authentication code does not include the second number sequence that agrees with the first number sequence generated by the first number sequence generator. Thus an invalid storage device (second control circuit) is detected with reliability.

Preferably, the first number sequence generator and the second number sequence generator respectively generates a different first number sequence and different second number sequence for each authentication process. In consequence, security is improved, since first and second authentication codes are changed for each authentication process.

Preferably, the first number sequence included in the first authentication code sent from the first control circuit to the second control circuit is different from the second number sequence included in the second authentication code sent from the second control circuit to the first control circuit in response to the first authentication code. In other words, the first authentication code that the communication device sends to the storage device is different from the second authentication code that the communication device receives from the storage device. In this way, using different authentication codes for sending and receiving improves security.

Preferably, the second authentication controller generates a second authentication code that includes an updated second number sequence generated subsequent to the second number sequence generated in authenticating the first control circuit. Thereby the second authentication code sent form the storage device to the communication device is changed from the first authentication code sent from the communication device to the storage device simply and reliably. The first authentication controller authenticates the second control circuit depending on whether an updated second number sequence included in the second authentication code agrees with an updated first number sequence generated subsequent to the first number sequence generated in generating the first authentication code. If the storage device is valid, the updated second number sequence included in the second authentication code agrees with the updated first number sequence generated by the first number sequence generator, while if the storage device is invalid, the updated second number sequence included in the second authentication code does not agree with the updated first number sequence generated by the first number sequence generator. Thus by verifying whether the updated second number sequence agrees with the updated first number sequence, validity of the storage device is determined simply and reliably.

The present invention achieves high-speed and efficient mutual authentication between a communication device and a storage device.

Moreover, the present invention successfully prevents fraudulent reading of content data from a storage device, despite an attack to manipulate control of a microprocessor.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
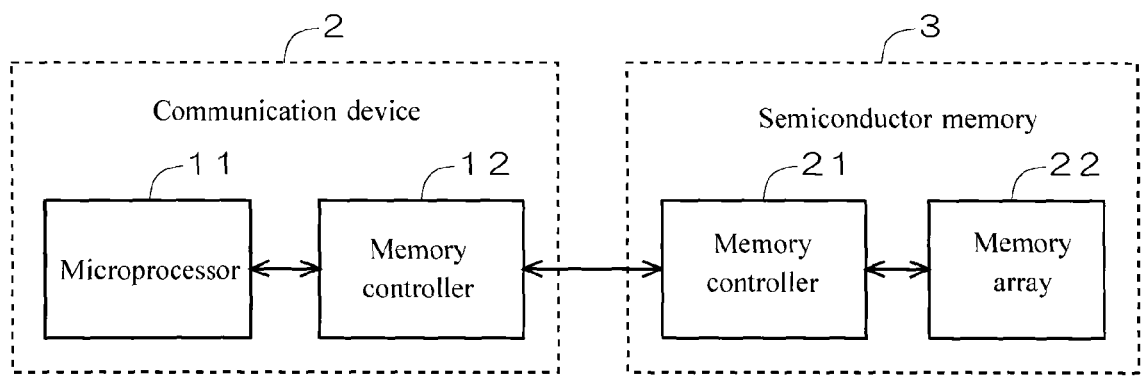
FIG. 1 is a diagram illustrating an overall configuration of an information processing system according to an embodiment of the present invention.

Preferred embodiments of the present invention are described in detail below referring to the drawings. It should be noted that identical reference numerals throughout the drawings indicate identical or equivalent elements.

FIG. 1 is a diagram illustrating an overall configuration of an information processing system 1 according to an embodiment of the present invention. The information processing system 1 includes a communication device 2 and a semiconductor memory 3. Examples of the communication device 2 include a personal computer. Examples of the semiconductor memory 3 include a memory card detachably connectable to the communication device 2. Alternatively, an arbitrary storage device such as an optical disc or a magnetic disk may be used as a substitute for the semiconductor memory 3.

The communication device 2 includes a microprocessor 11 (main controller) as a main system for controlling the information processing system 1 by software processing, and a memory controller 12 (first control circuit) provided in addition to the microprocessor 11. The memory controller 12 controls the semiconductor memory 3 by hardware processing.

The semiconductor memory 3 includes a memory array 22 (storage) in which arbitrary content data such as image, voice, text, code, or management data is stored, and a memory controller 21 (second control circuit) that controls the memory array 22. The memory array 22 is configured with, for example, a NAND flash memory. It should be noted that the memory array 22 is not limited to this example, but may be configured with a NOR flash memory.

Figure 2:
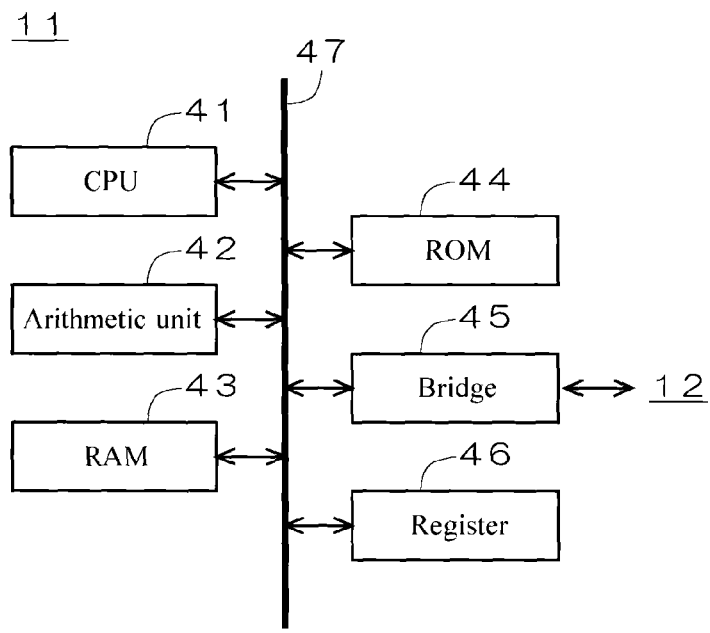
FIG. 2 is a diagram illustrating a configuration of a microprocessor.

FIG. 2 is a diagram illustrating a configuration of the microprocessor 11. The microprocessor 11 includes a CPU 41, an arithmetic unit 42, a RAM 43, a ROM 44, a bridge 45, and register 46 connected through a bus 47.

Figure 3:
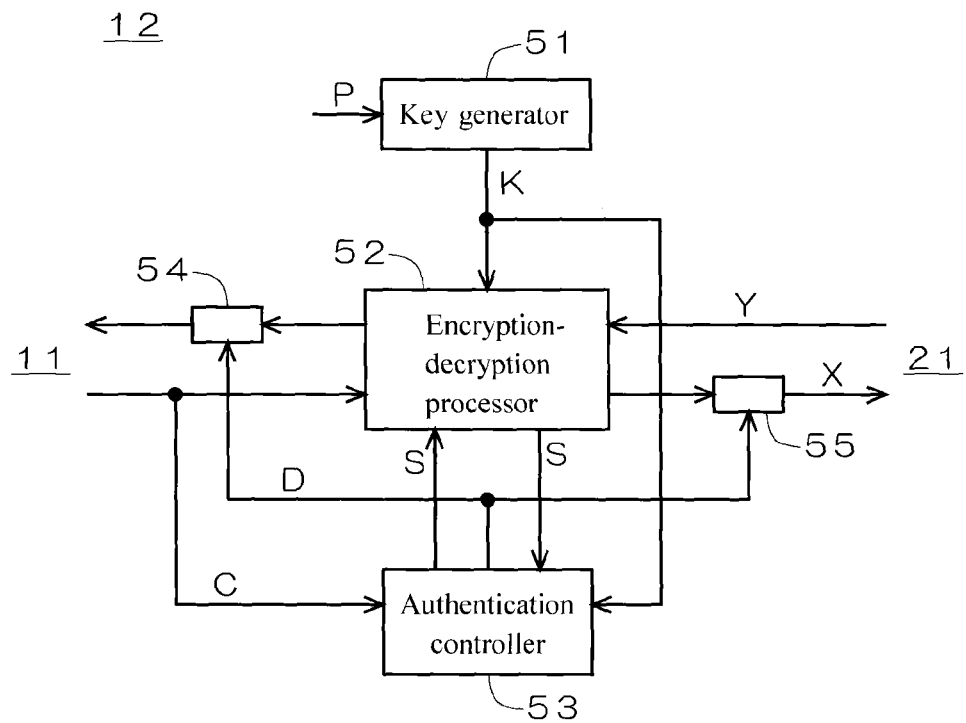
FIG. 3 is a diagram illustrating a configuration of a memory controller.

FIG. 3 is a diagram illustrating a configuration of a memory controller 12. FIG. 3 illustrates a relation of connection of the memory controller 12 including a key generator 51 (first number sequence generator), an encryption-decryption processor 52, an authentication controller 53 (first authentication controller), and mask circuits 54 and 55. The key generator 51 uses a common key P, which is a fixed value with high confidentiality, to generate a random number sequence (session key K in the example below) using a predetermined random number generation algorithm. Every time the memory controller 12 receives an authentication command C from the microprocessor 11, the key generator 51 generates a different session key K (nonce) each time.

Figure 4:
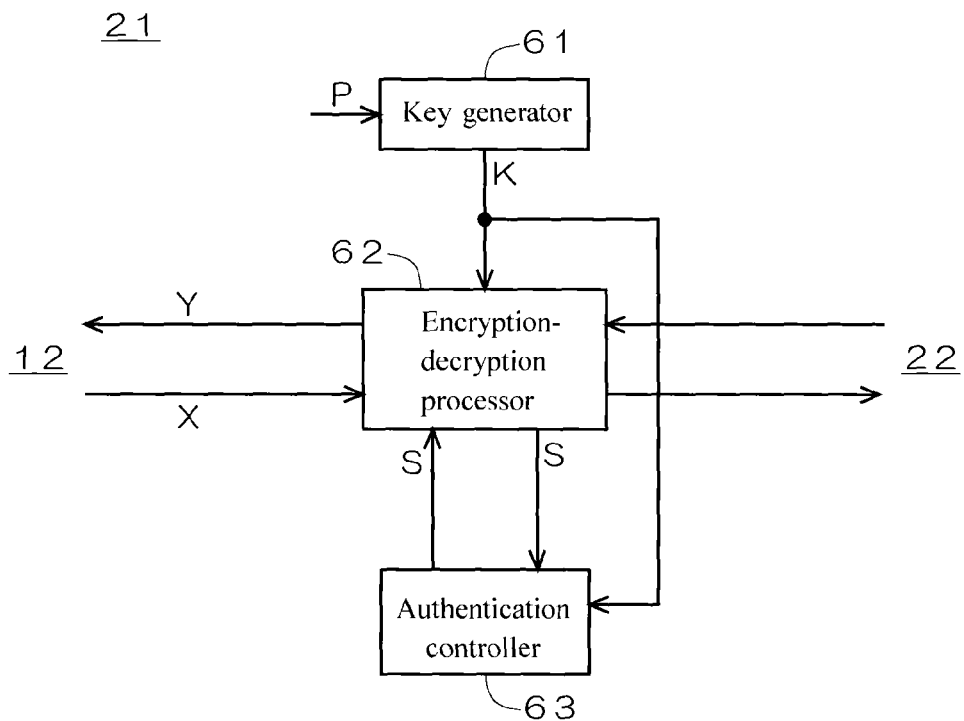
FIG. 4 is a diagram illustrating a configuration a memory controller.

FIG. 4 is a diagram illustrating a configuration of the memory controller 21. FIG. 4 illustrates a relation of connection of the memory controller 21 including a key generator 61 (second number sequence generator), an encryption-decryption processor 62, and an authentication controller 63 (second authentication controller). The key generator 61 uses the same common key P as the common key P that the key generator 51 holds, to generate the same session key K as the session key K generated by the key generator 51, using the same random number generation algorithm as the key generator 51. Every time the memory controller 21 receives an encrypted authentication code X from the memory controller 12, the key generator 61 generates a different session key K each time.

Referring to FIGS. 3 and 4, description is given of mutual authentication between the communication device 2 and the semiconductor memory 3. This example is based on the assumption that the encryption-decryption processors 52 and 62 have been initialized with a session key K(N−1) previously generated by the key generators 51 and 61. Furthermore, an access from the microprocessor 11 to the memory array 22 is not allowed until mutual authentication is completed and the validity of the communication device 2 and the semiconductor memory 3 is mutually authenticated.

The microprocessor 11 firstly issues an authentication command C having a predetermined byte length to instruct to perform mutual authentication. The authentication command C includes a specific command ID to identify that it is an authentication command and data other than the command ID. The memory controller 12 receives the authentication command C from the microprocessor 11 and inputs the received authentication command C to the authentication controller 53.

The key generator 51 generates a session key K(N) in response to a request by the authentication controller 53. The session key K(N) is input to the encryption-decryption processor 52 and the authentication controller 53.

The authentication controller 53 generates an authentication code S(N) based on the authentication command C and the session key K(N). For example, the data other than the command ID of the authentication command C is replaced by the session key K(N), so as to generate the authentication code S(N) including the command ID and the session key K(N). The authentication controller 53 inputs the generated authentication code S(N) to the encryption-decryption processor 52.

The encryption-decryption processor 52 encrypts the authentication code S(N) with the current session key K(N−1), so as to generate an encrypted authentication code X(N). The generated encrypted authentication code X(N) is sent to the memory controller 21.

The authentication controller 53 initializes the encryption-decryption processor 52 with the session key K(N) newly generated by the key generator 51.

The memory controller 21 inputs the encrypted authentication code X(N) received from the memory controller 12 to the encryption-decryption processor 62.

The encryption-decryption processor 62 decrypts the encrypted authentication code X(N) with the current session key K(N−1), so as to regenerate the authentication code S(N). The regenerated authentication code S(N) is input to the authentication controller 63.

The key generator 61 generates the session key K(N) in response to a request by the authentication controller 63. The session key K(N) is input to the encryption-decryption processor 62 and the authentication controller 63.

The authentication controller 63 compares the session key K(N) included in the authentication code S(N) regenerated by decrypting the encrypted authentication code X(N) with the session key K(N) input from the key generator 61, so as to authenticate the validity of the communication device 2 (or the memory controller 12: The same applies hereafter.). More specifically, if the two session keys K(N) agree, the communication device 2 is determined to be valid, and if the two session keys K(N) do not agree, the communication device 2 is determined to be invalid.

If the communication device 2 is determined to be invalid, the authentication controller 63 prohibits the encryption-decryption processor 62 from receiving data sent from the communication device 2. Thereby the memory controller 21 does not receive data sent from the communication device 2 to the semiconductor memory 3 thereafter.

In contrast, if the communication device 2 is determined to be valid, the authentication controller 63 then initialize the encryption-decryption processor 62 with the session key K(N) newly generated by the key generator 61.

The key generator 61 generates a subsequent session key K(N+1) in response to a request by the authentication controller 63. The session key K(N+1) is input to the authentication controller 63.

The authentication controller 63 generates an authentication code S(N+1) based on the session key K(N+1) input from the key generator 61. For example, the session key K(N+1) is used as the authentication code S(N+1) without being changed. The authentication controller 63 inputs the generated authentication code S(N+1) to the encryption-decryption processor 62.

The encryption-decryption processor 62 encrypts the authentication code S(N+1) with the current session key K(N), so as to generate an encrypted authentication code Y(N+1). The generated encrypted authentication code Y(N+1) is sent to the memory controller 12.

The memory controller 12 inputs the encrypted authentication code Y(N+1) received from the memory controller 21 to the encryption-decryption processor 52.

The encryption-decryption processor 52 decrypts the encrypted authentication code Y(N+1) with the current session key K(N), so as to regenerate the authentication code S(N+1). The regenerated authentication code S(N+1) is input to the authentication controller 53.

The key generator 51 generates the session key K(N+1) in response to a request by the authentication controller 53. The session key K(N+1) is input to the authentication controller 53.

The authentication controller 53 compares the session key K(N+1) included in the authentication code S(N+1) regenerated by decrypting the encrypted authentication code Y(N+1) with the session key K(N+1) input from the key generator 51, so as to authenticate the validity of the semiconductor memory 3 (or the memory controller 21: The same applies hereafter.). More specifically, if the two session keys K(N+1) agree, the semiconductor memory 3 is determined to be valid, and if the two session keys K(N+1) do not agree, the semiconductor memory 3 is determined to be invalid.

If the semiconductor memory 3 is determined to be invalid, the authentication controller 53 inputs a control signal D to enable masking such as replacing data with all "0"s or all "1"s to the mask circuits 54 and 55. Thereby communication thereafter between the communication device 2 and the semiconductor memory 3 is blocked.

In contrast, if the semiconductor memory 3 is determined to be valid, the authentication controller 53 inputs a control signal D to disable masking to the mask circuits 54 and 55. Thereby the communication device 2 is allowed to send a command to the semiconductor memory 3 to read content data, for example, and to receive content data from the semiconductor memory 3.

In the subsequent mutual authentication, the authentication controller 63 authenticates the validity of the memory controller 12 depending on whether or not the session key K(N+1) included in the regenerated authentication code S(N+1) agrees with the session key K(N+1) generated by the key generator 61. The authentication controller 53 authenticates the validity of the memory controller 21 depending on whether or not the session key K(N+2) included in the regenerated authentication code S(N+2) agrees with the session key K(N+2) generated by the key generator 51.

As describe above, in the information processing system 1 according to the present embodiment, the communication device 2 sends a first authentication code S(N) to the semiconductor memory 3. The semiconductor memory 3 authenticates the communication device based on the authentication code S(N), and if the communication device 2 is determined to be valid, sends a second authentication code S(N+1) to the communication device 2 in response to the authentication code S(N). Then the communication device 2 authenticates the semiconductor memory 3 based on the authentication code S(N+1). Thus mutual authentication between the communication device 2 and the semiconductor memory 3 is successfully performed by one-round communication of sending the authentication code S(N) from the communication device 2 to the semiconductor memory 3 and in response sending the authentication code S(N+1) from the semiconductor memory 3 to the communication device 2. In consequence, high-speed and efficient processing is achieved, compared to general challenge-response mutual authentication that requires one-round communication each from the communication device 2 and from the semiconductor memory 3 (two-round communication in total).

In the information processing system 1 according to the present embodiment, the authentication controller 63 authenticates validity of the communication device 2, depending on whether or not the session key K(N) included in the regenerated authentication code S(N) agrees with the session key K(N) generated by the key generator 61. If the communication device 2 is invalid, the authentication code S(N) does not include the session key K(N) that agrees with the session key K(N) generated by the key generator 61. Thus an invalid communication device 2 is detected with reliability. The authentication controller 53 authenticates validity of the memory controller 21 depending on whether or not the session key K(N+1) included in the regenerated authentication code S(N+1) agrees with the session key K(N+1) generated by the key generator 51. If the semiconductor memory 3 is invalid, the authentication code S(N+1) does not include the session key K(N+1) that agrees with the session key K(N+1) generated by the key generator 51. Thus an invalid semiconductor memory 3 is detected with reliability.

In the information processing system 1 according to the present embodiment, the key generators 51 and 61 generate a different session key K for each authentication process. In consequence, security is improved, since an authentication code S is changed for each authentication process.

In the information processing system 1 according to the present embodiment, the session key K(N) included in the authentication code S(N) sent from the communication device 2 to the semiconductor memory 3 is different from the session key K(N+1) included in the authentication code S(N+1) sent from the semiconductor memory 3 to the communication device 2 in response to the authentication code S(N). In other words, the authentication code S(N) that the communication device 2 sends to the semiconductor memory 3 is different from the authentication code S(N+1) that the communication device 2 receives from the semiconductor memory 3. In this way, using different authentication codes S for sending and receiving improves security.

In the information processing system 1 according to the present embodiment, the authentication controller 63 generates the authentication code S(N+1) that includes the updated session key K(N+1) generated subsequent to the session key K(N) generated in authenticating the communication device 2. Thereby the authentication code S(N+1) sent from the semiconductor memory 3 to the communication device 2 is changed from the authentication code S(N) sent from the communication device 2 to the semiconductor memory 3 simply and reliably. The authentication controller 53 authenticates the semiconductor memory 3 depending on whether or not the updated session key K(N+1) included in the authentication code S(N+1) agrees with the updated session key K(N+1) generated subsequent to the session key K(N) generated in generating the authentication code S(N). If the semiconductor memory 3 is valid, the updated session key K(N+1) included in the authentication code S(N+1) agrees with the updated session key K(N+1) generated by the key generator 51, while if the semiconductor memory 3 is invalid, the updated session key K(N+1) included in the authentication code S(N+1) does not agree with the updated session key K(N+1) generated by the key generator 51. Thus by verifying whether the two session keys K(N+1) agree, validity of the semiconductor memory 3 is determined simply and reliably.

As described above, in the information processing system 1 according to the present embodiment, the microprocessor 11 (main controller) issues an authentication command C to instruct to perform mutual authentication between the communication device 2 and the semiconductor memory 3. Upon receipt of the authentication command C, the memory controller 12 (first control circuit) performs mutual authentication with the memory controller 21 (second control circuit). In this mutual authentication between the communication device 2 and the semiconductor memory 3, processing performed by the microprocessor 11 includes only issuance of the authentication command C, and essential processing such as generation and verification of authentication codes is performed between the memory controllers 12 and 21. Thus despite an attack by manipulating control of the microprocessor 11 such as analysis of programs and tampering of data in the ROM 44 or RAM 43, an attacker fails to avoid mutual authentication unless hardware processing of the memory controllers 12 and 21 are analyzed and manipulated. In consequence, fraudulent reading of content data from the semiconductor memory 3 is successfully prevented despite an attack to manipulate the control of the microprocessor 11.

In the information processing system 1 according to the present embodiment, the memory controller 12 generates a first authentication code S(N) to instruct the memory controller 21 to authenticate the memory controller 12, based on the authentication command C received from the microprocessor 11. In this way, since the authentication code S(N) is generated not by the microprocessor 11 but by the memory controller 12, an attacker cannot identify the authentication code S(N) by an attack such as program analysis. In consequence, fraudulent reading of content data from the semiconductor memory 3 is successfully prevented.

In the information processing system 1 according to the present embodiment, the memory controller 12 generates an authentication code S(N) by replacing data other than a command ID in the authentication command C with a number sequence generated by the memory controller itself. This achieves simple generation of an authentication code that cannot be identified by an attack such as program analysis. Since the authentication code S(N) includes the command ID, the memory controller 21 appropriately starts mutual authentication upon receipt of the authentication code S(N).

In the information processing system 1 according to the present embodiment, if the memory controller 12 is determined to be invalid, the memory controller 21 rejects to receive data sent from the communication device 2 to the semiconductor memory 3 thereafter. Thus despite a read command sent from an invalid communication device 2 to the semiconductor memory 3, the semiconductor memory 3 rejects to receive the read command. In consequence, fraudulent reading of content data from the semiconductor memory 3 is successfully prevented.

In the information processing system 1 according to the present embodiment, if the memory controller 12 is determined to be valid, the memory controller 21 generates a second authentication code S(N+1) to instruct the memory controller 12 to authenticate the memory controller 21, and sends the authentication code S(N+1) to the memory controller 12. Thus mutual authentication between the communication device 2 and the semiconductor memory 3 is successfully performed by one-round communication of sending the authentication code S(N) from the memory controller 12 to the memory controller 21 and in response sending the authentication code S(N+1) from the memory controller 21 to the memory controller 12. In consequence, high-speed and efficient processing is achieved, compared to general challenge-response mutual authentication that requires one-round communication each from the communication device 2 and from the semiconductor memory 3 (two-round communication in total).

In the information processing system 1 according to the present embodiment, if the memory controller 21 is determined to be invalid, the memory controller 12 blocks communication thereafter between the communication device 2 and the semiconductor memory 3. This prevents a read command from being sent from the communication device 2 to an invalid semiconductor memory 3 and content data from being sent from the invalid semiconductor memory 3 to the communication device 2. In consequence, fraudulent reading of content data from the semiconductor memory 3 is successfully prevented.

In the information processing system 1 according to the present embodiment, the authentication controller 63 authenticates validity of the memory controller 12, depending on whether or not the session key K(N) included in the regenerated authentication code S(N) agrees with the session key K(N) generated by the key generator 61. If the communication device 2 is invalid, the authentication code S(N) does not include the session key K(N) that agrees with the session key K(N) generated by the key generator 61. Thus an invalid communication device 2 is detected with reliability. The authentication controller 53 authenticates validity of the memory controller 21, depending on whether or not the session key K(N+1) included in the regenerated authentication code S(N+1) agrees with the session key K(N+1) generated by the key generator 51. If the semiconductor memory 3 is invalid, the authentication code S(N+1) does not include the session key K(N+1) that agrees with the session key K(N+1) generated by the key generator 51. Thus an invalid semiconductor memory 3 is detected with reliability.

In the information processing system 1 according to the present embodiment, the key generators 51 and 61 each generates a different session key K for each authentication process. In consequence, security is improved, since an authentication code S is changed for each authentication process.

In the information processing system 1 according to the present embodiment, the session key K(N) included in the authentication code S(N) sent from the memory controller 12 to the memory controller 21 is different from the session key K(N+1) included in the authentication code S(N+1) sent from the memory controller 21 to the memory controller 12 in response to the authentication code S(N). In other words, the authentication code S(N) that the communication device 2 sends to the semiconductor memory 3 is different from the authentication code S(N+1) that the communication device 2 receives from the semiconductor memory 3. In this way, using different authentication codes S for sending and receiving improves security.

In the information processing system 1 according to the present embodiment, the authentication controller 63 generates the authentication code S(N+1) that includes the updated session key K(N+1) generated subsequent to the session key K(N) generated in authenticating the memory controller 12. Thereby the authentication code S(N+1) sent from the semiconductor memory 3 to the communication device 2 is changed from the authentication code S(N) sent from the communication device 2 to the semiconductor memory 3 simply and reliably. The authentication controller 53 authenticates the memory controller 21 depending on whether or not the session key K(N+1) included in the authentication code S(N+1) agrees with the updated session key K(N+1) generated subsequent to the session key K(N) generated in generating the authentication code S(N). If the semiconductor memory 3 is valid, the updated session key K(N+1) included in the authentication code S(N+1) agrees with the updated session key K(N+1) generated by the key generator 51, while if the semiconductor memory 3 is invalid, the updated session key K(N+1) included in the authentication code S(N+1) does not agree with the updated session key K(N+1) generated by the key generator 51. Thus by verifying whether the two session keys K(N+1) agree, validity of the semiconductor memory 3 is determined simply and reliably.

While the invention has been described in detail, the foregoing description is in all aspects illustrative and not restrictive. It is understood that numerous other modifications and variations can be devised without departing from the scope of the invention.

What is claimed is:

1. An information processing system comprising:
    a communication device; and
    a storage device connected to the communication device,
    the communication device including
    a first number sequence generator configured to generate a first number sequence; and
    a first authentication controller configured to generate a first authentication code to instruct the storage device to authenticate the communication device,
    the storage device including
    a second number sequence generator configured to generate a second number sequence identical to the first number sequence generated by the first number sequence generator; and
    a second authentication controller configured to generate a second authentication code to instruct the communication device to authenticate the storage device,
    the first authentication controller being configured to generate the first authentication code that includes the first authentication code generated by the first number sequence generator and send the first authentication code to the storage device,
    the second authentication controller being configured to authenticate the communication device depending on whether the first number sequence included in the received first authentication code agrees with the second number sequence generated by the second number sequence generator, and if the communication device is determined to be valid, generate the second authentication code that includes a third number sequence generated by the second number sequence generator subsequent to the second number sequence and send the second authentication code to the communication device, and
    the first authentication controller being configured to authenticate the storage device depending on whether the third number sequence included in the received second authentication code agrees with a fourth number sequence generated by the first number sequence generator subsequent to the first number sequence, and mutual authentication between the communication device and the storage device is performed by one-round communication of sending the first authentication code from the communication device to the storage device and in response sending the second authentication code from the storage device to the communication device.

2. The information processing system according to claim 1, wherein the first number sequence generator and the second number sequence generator respectively generate different first number sequence and second number sequence for each authentication process.

3. An information processing system comprising:
    a communication device; and
    a storage device connected to the communication device,
    the communication device including
    a main controller configured to control the information processing system by software processing; and
    a first control circuit provided in addition to the main controller and configured to control the storage device by hardware processing;
    the storage device including
    a storage configured to store content data; and
    a second control circuit configured to control the storage,
    the first control circuit including
    a first number sequence generator configured to generate a first number sequence; and
    a first authentication controller configured to generate a first authentication code to instruct the second control circuit to authenticate the first control circuit,
    the second control circuit including
    a second number sequence generator configured to generate a second number sequence identical to the first number sequence generated by the first number sequence generator; and
    a second authentication controller configured to generate a second authentication code to instruct the first control circuit to authenticate the second control circuit,
    the main controller being configured to issue a command to instruct mutual authentication between the communication device and the storage device,
    the first control circuit being configured to generate the first authentication code that includes the first number sequence generated by the first number sequence generator and send the first authentication code to the second control circuit, upon receipt of the command,
    the second authentication controller being configured to authenticate the first control circuit depending on whether the first number sequence included in the received first authentication code agrees with the second number sequence generated by the second number sequence generator, and if the first control circuit is determined to be valid, generate the second authentication code that includes a third number sequence generated by the second number sequence generator subsequent to the second number sequence and send the second authentication code to the first control circuit, and
    the first authentication controller being configured to authenticate the second control circuit depending on whether the third number sequence included in the received second authentication code agrees with a fourth number sequence generated by the first number sequence generator subsequent to the first number sequence, and the mutual authentication between the communication device and the storage device is performed by one-round communication of sending the first authentication code from the communication device to the storage device and in response sending the second authentication code from the storage device to the communication device.

4. The information processing system according to claim 3, wherein the first control circuit generates the first authentication code by replacing data other than a command ID in the command with a number sequence generated by the first control circuit itself.

5. The information processing system according to claim 3, wherein
the second control circuit authenticates the first control circuit based on the first authentication code, and if the first control circuit is determined to be invalid, refuses to receive data sent from the communication device to the storage device thereafter.

6. The information processing system according to claim 3, wherein
the first control circuit authenticates the second control circuit based on the second authentication code, and if the second control circuit is determined to be invalid, blocks communication thereafter between the communication device and the storage device.

7. The information processing system according to claim 3, wherein
the first number sequence generator and the second number sequence generator respectively generate different first number sequence and second number sequence for each authentication process.

* * * * *